(No Model.) 6 Sheets—Sheet 1.

F. LENNARD.
APPARATUS FOR THE DISTILLATION OF TAR.

No. 459,123. Patented Sept. 8, 1891.

Witnesses:
Inventor:
Frederic Lennard
by Marathon Bailey
his attorney (No Model.) 6 Sheets—Sheet 2.

F. LENNARD.
APPARATUS FOR THE DISTILLATION OF TAR.

No. 459,123. Patented Sept. 8, 1891.

Witnesses:
Ewell A. Dick
Will E. Aughinbaugh

Inventor:
Frederic Lennard
by Marcellus Bailey
his Attorney (No Model.) 6 Sheets—Sheet 3.

F. LENNARD.
APPARATUS FOR THE DISTILLATION OF TAR.

No. 459,123. Patented Sept. 8, 1891.

Witnesses:
Inventor:

(No Model.)  6 Sheets—Sheet 4.
F. LENNARD.
APPARATUS FOR THE DISTILLATION OF TAR.
No. 459,123. Patented Sept. 8, 1891.
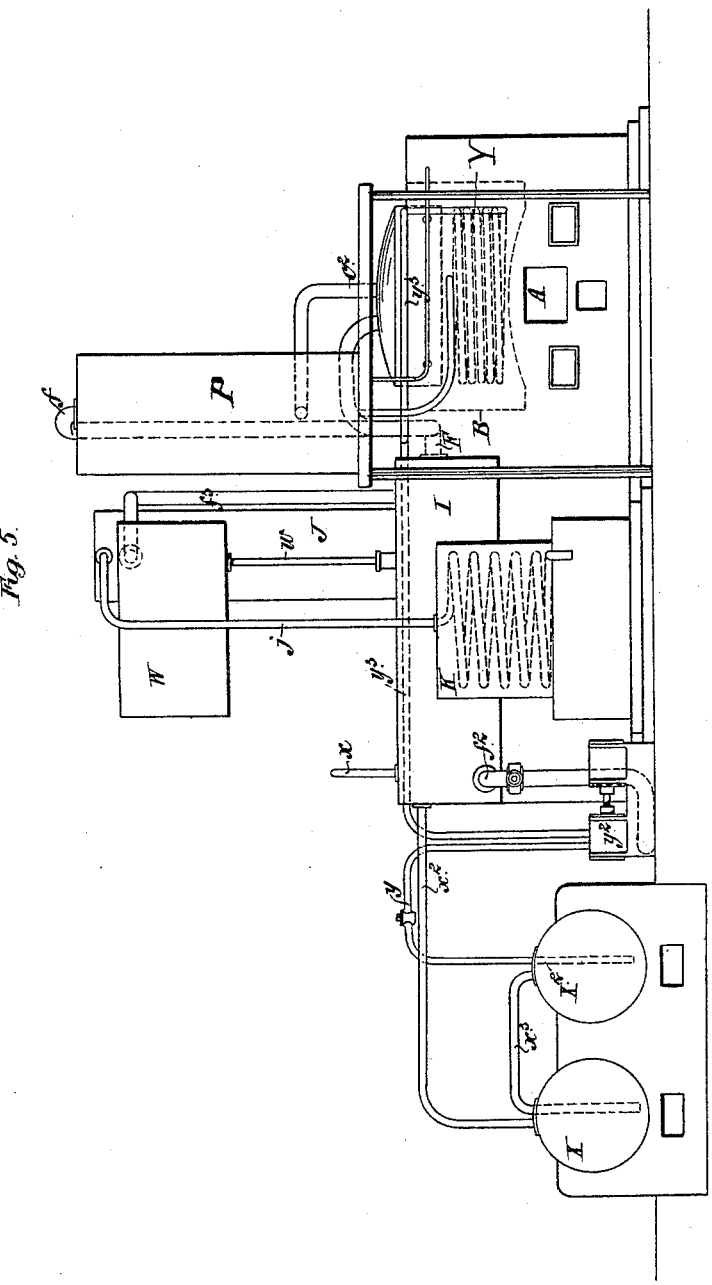
Witnesses:
Inventor:

(No Model.) 6 Sheets—Sheet 5.
F. LENNARD.
APPARATUS FOR THE DISTILLATION OF TAR.
No. 459,123. Patented Sept. 8, 1891.
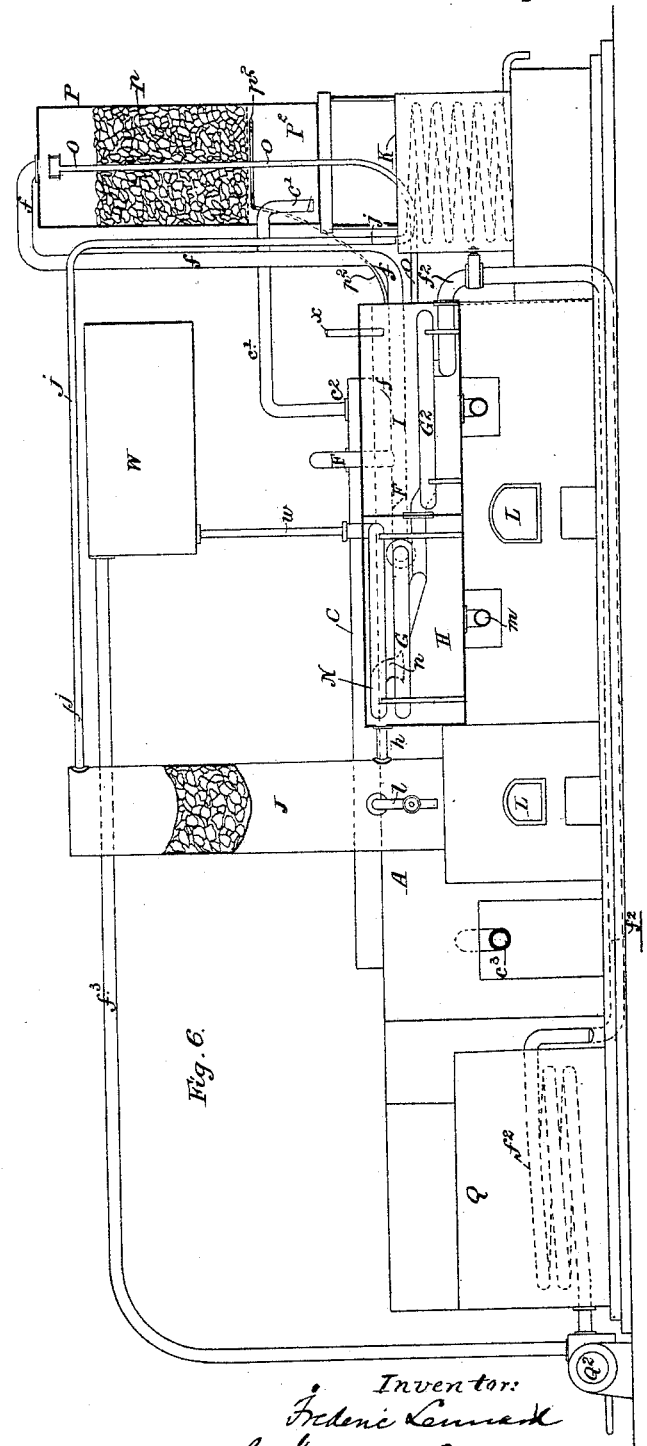

(No Model.)  6 Sheets—Sheet 6.
F. LENNARD.
APPARATUS FOR THE DISTILLATION OF TAR.
No. 459,123.  Patented Sept. 8, 1891.
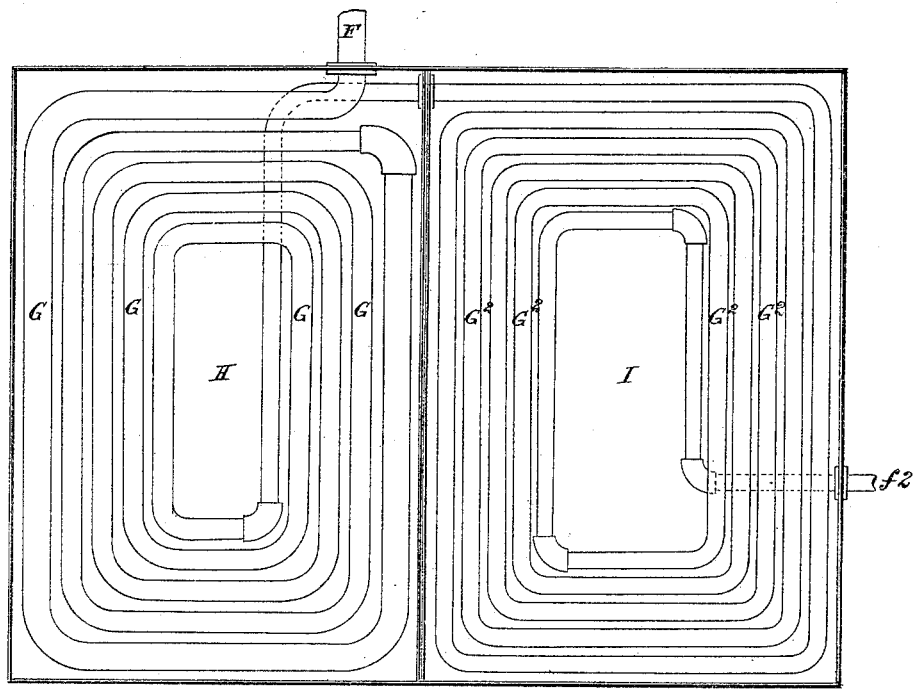
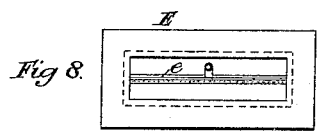
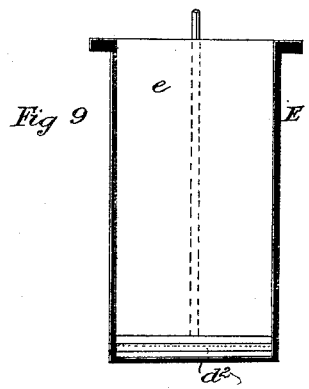
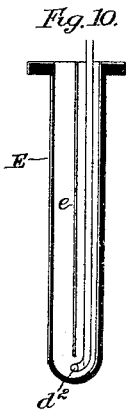
Witnesses:
Inventor:
Frederic Lennard

UNITED STATES PATENT OFFICE.

FREDERIC LENNARD, OF EAST GREENWICH, ENGLAND.

APPARATUS FOR THE DISTILLATION OF TAR.

SPECIFICATION forming part of Letters Patent No. 459,123, dated September 8, 1891.

Application filed April 17, 1889. Serial No. 307,564. (No model.) Patented in England May 17, 1888, No. 7,334.

*To all whom it may concern:*

Be it known that I, FREDERIC LENNARD, (manufacturing chemist,) a subject of the Queen of Great Britain, and residing at Ordnance Wharf, Blackwall Lane, East Greenwich, in the county of Kent, England, have invented certain Improvements in and Apparatus for the Distillation of Tar and the Like, (for which I have applied for a patent in Great Britain, No. 7,334, dated May 17, 1888,) of which the following is a specification.

The object of my invention is to provide means whereby the distillation of tar or other matters which can be distilled according to my invention is effected in a continuous manner, and more rapidly, economically, and efficiently than hitherto.

I will refer to tar in describing my invention; but it is to be understood that I do not thereby intend to limit my invention to the distillation of tar.

According to my invention I cause the tar to be subjected to distillation to pass in films or streams of but small depth over surfaces which are heated, preferably, with the intervention of a bath of oil or other liquid which can be conveniently raised to and maintained at the temperature necesssry for distilling the tar. To insure the effectual working of the still, the tar before being admitted to the still should be raised to such a temperature that distillation commences immediately the tar enters the still. The volatile products are collected as they arise and the pitch passes off at the outlet. Steam should be injected into the still to facilitate the distillation.

The accompanying drawings illustrate an apparatus arranged according to my invention.

Figure 1:
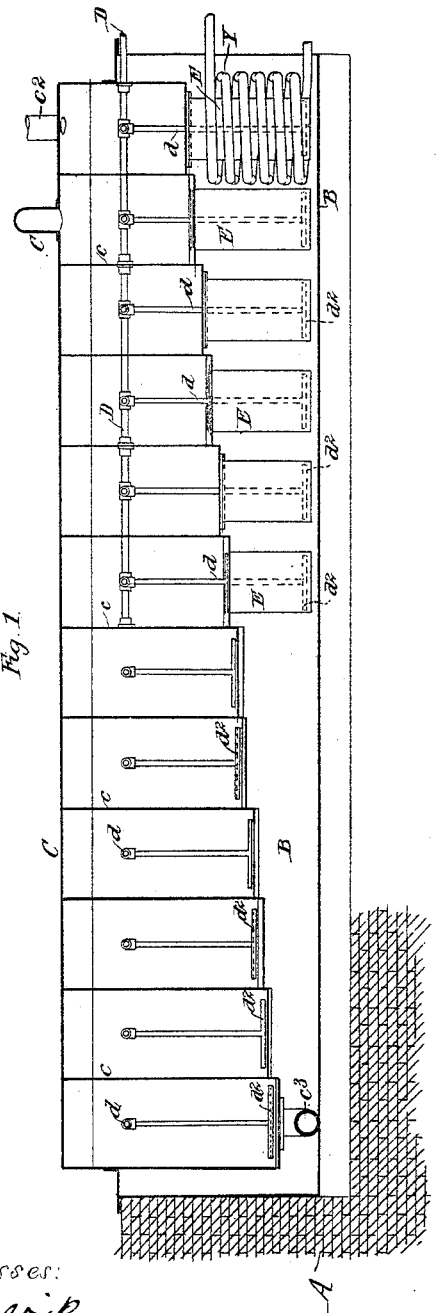
Figure 3:
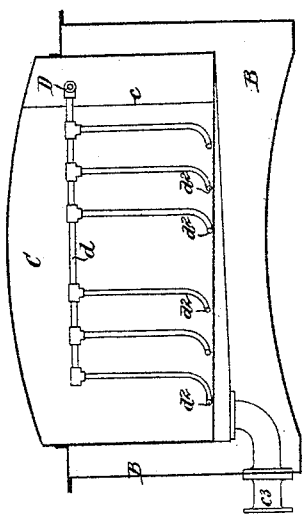
Figure 2:
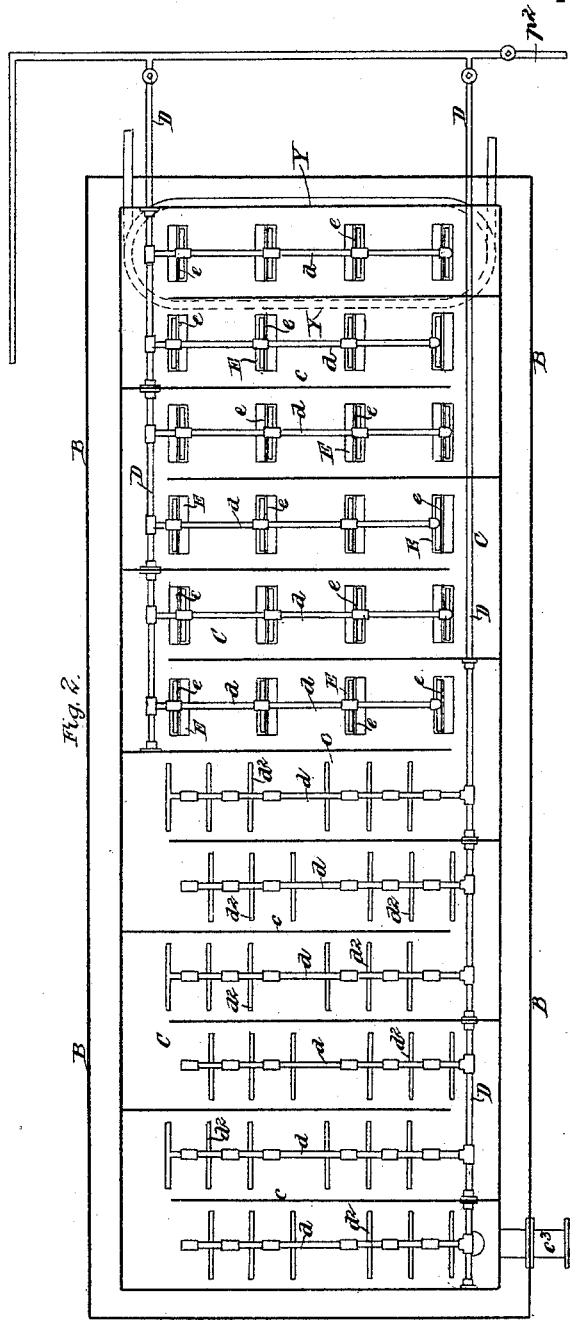
Figure 4:
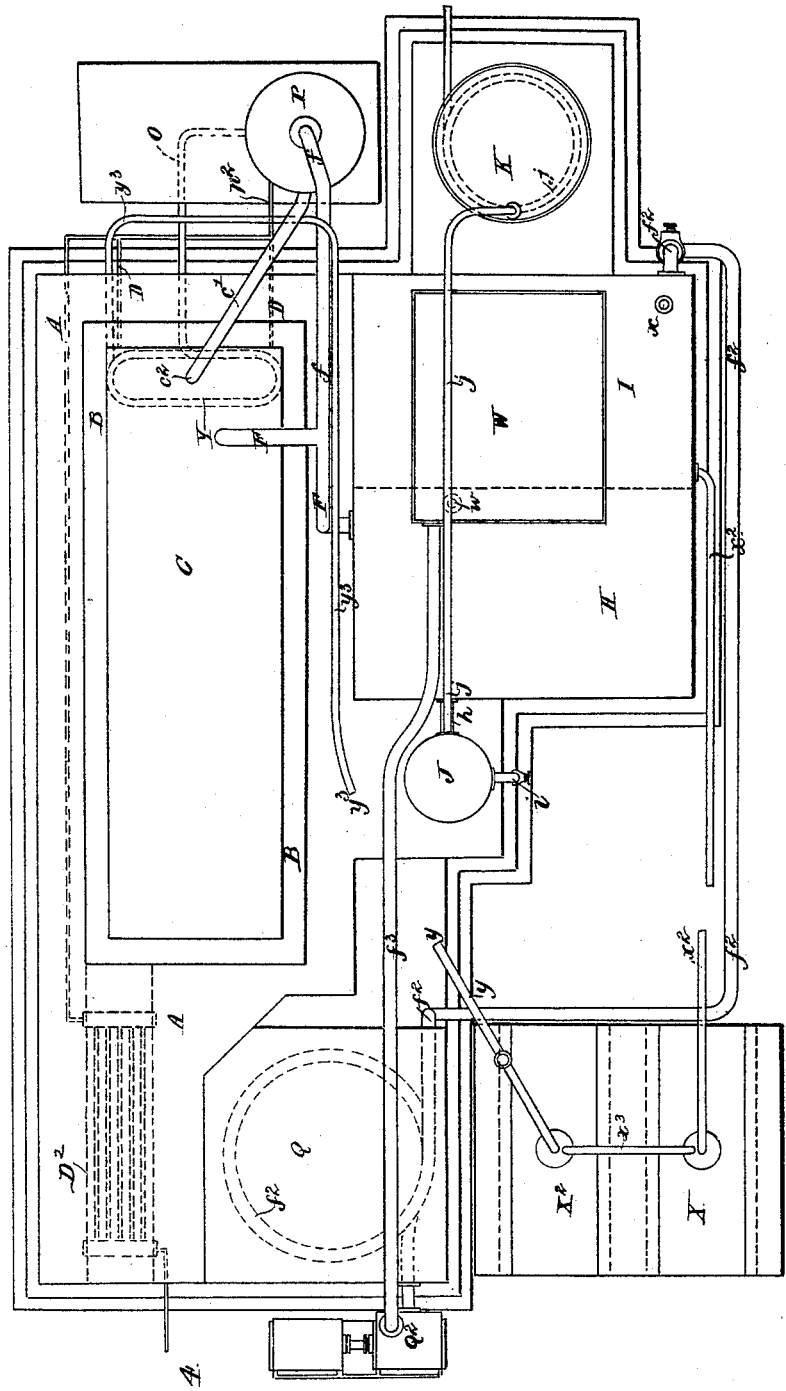

Figure 1 is a longitudinal section, Fig. 2 is a sectional plan, and Fig. 3 is a transverse section of a still or vessel for distilling the tar according to my invention. Fig. 4 is a plan of the complete plant, and Figs. 5 and 6 are respectively an end and side view of the same. Fig. 7 is a plan with the top removed of the tanks in which the vapors are condensed; and Figs. 8, 9, and 10 are respectively a plan and sections at right angles to each other of the wells in the still, all as hereinafter explained.

In the furnace A (see Fig. 4) I mount a vessel or trough B for containing the oil or liquid which is to be used as the vehicle for heating the still C, in which the tar is to be distilled and which is immersed or partially immersed in the said oil or liquid. The said still has a number of divisions $c$ in it, the bottom surfaces between each division being lower and lower as they recede from the tar-inlet $c^2$ and approach the pitch-outlet $c^3$, as shown clearly in Fig. 1, so that the tar can flow from one to the other. The partitions have openings alternately at opposite sides of the still, and the bottom surfaces or floors of the still are preferably inclined alternately in opposite directions transversely of the still, so that the tar passes over the bottom surface in one direction transversely to the length of the still, and then passes on to the next lower bottom surface of the still, and passes therealong in the opposite direction, and so on in alternately one and the other direction and descending from each bottom surface between the partitions to the one next below it, and so on to the exit, by which time it will have been converted into pitch. Steam-pipes D are led into the still, and branches $d$ therefrom, with outlet-jets $d^2$, are situated in each division of the still near to the bottom surfaces. The first division of the still and several of the following divisions have wells E below the bottom surfaces, with dividing-plates $e$ therein, and the steam-jets $d^2$ in these divisions are led to the lower part of the wells. The tar on its way through the still passes from the bottom surface into these wells and overflows onto the surface again, and passes thereover into the next compartment of the still and down the wells in that compartment, and overflows from those wells, and so on, the steam passed by the jets $d^2$ into the wells thoroughly acting on the tar therein. The supply of steam to the jets in the wells may be separate from the supply to the other jets, so that the supply to the wells can be regulated independently of the supply to the others.

$D^2$ is a superheater in the furnace-flue for superheating the steam on its way to the still.

I prefer to heat the tar for supply to the still by passing it through a coil Y, immersed in the liquid bath B. From this coil the tar passes by the pipe O to the top of the scrubber P, passing down through the scrubbing material $p$ and being met by an ascending jet of steam from the perforated pipe $p^2$. The vapor given off by the tar in the scrubber passes by the pipe $f$ to the pipe F, and the tar, which falls to the bottom of the chamber $P^2$, passes by the pipe $c'$ to the still C. The products of distillation pass from the still into a pipe F, which conducts them into the coils G and $G^2$ in the condensers H and I, through which coils they pass, being then led by the pipe $f^2$ to a condenser Q, where their condensation is completed and whence they are pumped by the pump $Q^2$ through the pipe $f^3$ to the tank W; or the product of distillation may be collected and treated as desired. These liquors or oils resulting from the condensation of the gaseous products from the still may be used for condensing or assisting in condensing the gases as they pass from the still, the heat of which gases will at the same time subject the liquors or oils to fractional distillation by driving off from the said liquors or oils the more volatile products, such as naphtha and creosote, the vapors of which can be passed into a tower, from the top of which the naphtha vapors pass off to be condensed, and the creosote passes off at the lower part. The anthracene and heavy oils remaining behind in the tank are let off as they accumulate; or, as in the construction shown, I may force the liquors or oils from the tank H, after being heated, into the top of a tower or scrubber J, the liquors or oils, in their passage down through the scrubbing materials therein, being met by an ascending current of steam, which will carry the creosote and light oils into the coil in the tank K, the anthracene and heavy oils falling to the bottom of the tower or scrubber, whence they are drawn off as required and allowed to flow away.

The liquors or oils before they are admitted into the tank H are preferably heated, as hereinafter described, to a temperature sufficient to prevent their descending to the bottom of the tank and passing off undistilled. The tar may on its way to the coil in the liquid bath also be used for condensing or assisting in condensing the vapors passing from the still. The arrangements for the aforesaid purposes illustrated in the drawings consist as follows: The vapors from the still pass on their way to the condenser through coils G $G^2$, which are situated in two tanks H and I. Through the tank I the tar may be passed, entering by the pipe $x$ and passing away by the pipe $x^2$ to the boiler X, in which the water is separated therefrom. From this boiler the tar passes by pipe $x^3$ into the boiler $X^2$, and thence by the pipe $y$ to the pump $y^2$, which forces it by the pipe $y^3$ into the coil Y in the oil bath. The condensed liquors or oils may be forced by a pump or passed from an overhead tank W by the pipe $w$ or otherwise into the tank H, so that the hot gases passing through the coil G from the still C (while being themselves condensed) drive off the more volatile products, such as naphtha and creosote, the vapors of which pass by the pipe $h$ into the tower or scrubber J, from the top of which the naphtha vapors pass by the pipe $j$ into the coil in the condenser K, the creosote passing off by the pipe $l$. The anthracene and heavy oils which remain in the tank H are at intervals drawn off at $m$. The liquors or oils before entering the tank H are heated, which may be effected by their being caused to pass into a coil N, which is situated in the tank H, and so the said vapors or oils are in their passage through the coil heated to a temperature equal to that of the liquors or oil in the tank H before their exit from the coil by the distributing-outlet $n$, so that they do not sink, as they would do if admitted cold. The tank H and also the tower J may have furnaces or heaters L L under them to heat them independently of the coil G when necessary. Steam may, if desired, be admitted to the tank H, preferably about midway of its depth, and the distillation may, if desired, be facilitated by a vacuum or partial vacuum created by a pump or the like at the outlet.

Having now particularly described and ascertained the nature of my said invention and in what manner the same is to be performed, I declare that what I claim is—

1. In an apparatus for distilling tar and like substances, the combination of a furnace or heater, a tank containing a liquid bath, a still immersed or partially immersed therein, a tower or scrubber, means for conducting the material to be distilled into the upper part of the scrubber, a connection between the lower part of the scrubber and the still, a steam-pipe leading into the lower part of the scrubber, and conduits which lead off the vaporous products rising into the upper part of the scrubber, substantially as set forth.

2. In an apparatus for distilling tar and like substances, the combination of a furnace or heater, a tank or receptacle containing an oil bath, a still immersed in the said bath, a coil Y, situated in the bath, for heating the tar, a scrubber situated between the said coil and the still, and connections between the coil and the scrubber and the scrubber and the still, said parts being arranged substantially as set forth, whereby the tar is first heated and then passed through the scrubber before being delivered to the still.

3. In an apparatus for distilling tar and like substances, the combination of a furnace or heater, a tank or receptacle containing an oil or liquid bath, a still immersed or partially immersed therein, means for admitting steam into the still, a scrubber through which the substance to be distilled is passed before being passed to the still, connections between the scrubber and the still, and means for admitting steam into the scrubber, substantially as set forth.

4. In an apparatus for effecting the distillation of tar and similar substances, the combination of a heating device, a tank or receptacle containing an oil or liquid bath, a still immersed or partly immersed therein having partitions which divide it into a number of divisions or compartments, certain of such compartments having wells E below their bottoms, and the steam-pipes by which steam is passed into the wells and through the material therein, substantially as described.

5. In an apparatus for distilling tar and similar substances, the combination of the still, the pipes through which the vapors from the still are conducted away, the condensing apparatus by which the vaporous products from the still are condensed, the receptacle for such condensed products, the said pipes which lead from the still passing through the said receptacle, and the pipes which lead from the said receptacle and carry off the vapors from the said condensed products, which are driven off by the hot vapors which are led through the contents of the receptacle in the first said pipes, substantially as described.

6. In an apparatus for distilling tar and similar substances, the combination of the still, the condenser for the products driven off from the still, the connections between the still and the condenser, a receptacle in which the condensed products are collected, means for heating these products in such receptacle, a scrubber J, a steam-pipe leading into the lower part of the scrubber, and a conduit leading from said receptacle to the top of the scrubber, through which the hot condensed products may be led into the scrubber, substantially as described.

7. The herein-described process of distilling tar and similar substances, which consists in heating such substance in a still to drive off its volatile constituents, condensing the products so driven off and collecting them in a receptacle, and finally freeing them from their more volatile constituents by heating them by means of the hot vapors driven off from the still, substantially as described.

8. The herein-described process of distilling tar and similar substances, which consists in heating such substance in a still to drive off its more volatile constituents, condensing the products so driven off and collecting them, then heating them, and finally subjecting them while hot to the action of steam in a scrubber, substantially as described.

In testimony whereof I have signed my name to this specification in the presence of two subscribing witnesses.

FREDERIC LENNARD.

Witnesses:
JAMES FORBES,
   165 *Fenchurch St., London, E. C.*
R. CALLON,
   9 *Birchin Lane, London, E. C.*